US009849954B1

(12) United States Patent
Jun et al.

(10) Patent No.: US 9,849,954 B1
(45) Date of Patent: Dec. 26, 2017

(54) GLASS SPHERE TYPE PRESSURE HOUSING INCLUDING TITANIUM BAND AND A MULTI-JOINT UNDERWATER ROBOT SYSTEM FOR DEEP SEA EXPLORATION USING THE SAME

(71) Applicant: KOREA INSTITUTE OF OCEAN SCIENCE & TECHNOLOGY, Ansan-si, Gyeonggi-do (KR)

(72) Inventors: Bong-Huan Jun, Sejong-si (KR); Hyung-Won Shim, Sejong-si (KR); Jin-Yeong Park, Daejeon (KR); Seong-Yeol Yoo, Sejong-si (KR); Hyuk Baek, Sejong-si (KR); Pan-Mook Lee, Daejeon (KR)

(73) Assignee: Korea Institute of Ocean Science & Technology, Ansan-si (KR)

( * ) Notice: Subject to any disclaimer, the term of this patent is extended or adjusted under 35 U.S.C. 154(b) by 0 days.

(21) Appl. No.: 15/364,046

(22) Filed: Nov. 29, 2016

(30) Foreign Application Priority Data

Jun. 13, 2016  (KR) .................. 10-2016-0073409
Jun. 13, 2016  (KR) .................. 10-2016-0073416

(51) Int. Cl.
*B63G 8/14*  (2006.01)
*B63G 8/00*  (2006.01)
(Continued)

(52) U.S. Cl.
CPC .......... *B63G 8/001* (2013.01); *B62D 57/032* (2013.01); *B63G 8/08* (2013.01); *B63G 8/14* (2013.01);
(Continued)

(58) Field of Classification Search
CPC . Y10S 901/01; B63G 8/001; B63B 2022/006; B63B 3/13
See application file for complete search history.

(56) References Cited

U.S. PATENT DOCUMENTS

| 2,987,893 A | 6/1961 | Robinson, Jr. |
| 3,587,122 A * | 6/1971 | Humphrey ................ B63B 3/13 |
| | | 220/4.25 |
| 4,692,906 A * | 9/1987 | Neeley .................... G01V 1/38 |
| | | 114/333 |

FOREIGN PATENT DOCUMENTS

| FR | 2 416 808 A1 | 9/1979 |
| JP | S62 28181 A | 2/1987 |

(Continued)

OTHER PUBLICATIONS

Partial English translation of relevant part of KR 1990-0003489 dated Mar. 26, 1990, listed above, 1 page.
(Continued)

*Primary Examiner* — Edwin Swinehart
(74) *Attorney, Agent, or Firm* — Lewis Roca Rothgerber Christie LLP

(57) ABSTRACT

A deep-sea exploration multi-joint underwater robot system and a spherical glass pressure housing including a titanium band are provided. The system includes a multi-joint underwater robot having a multiple of first and second pressure housings withstanding deep-sea pressure and shielding built-in equipment from seawater and performing close precision seabed exploration obtaining marine research data to transmit underwater status data, a mothership receiving and storing marine research and underwater status data and monitoring and controlling moving directions of multi-joint underwater robot, and a depressor having third pressure housing, linked with mothership by primary cable and multi-joint underwater robot by secondary cable, and preventing transmission of primary cable water resistance to multi-joint underwater robot, wherein first spherical pressure housings are mounted on robot body frame, second cylindrical pressure housings are mounted between left and
(Continued)

right legs, and the third cylindrical pressure housing is mounted inside the depressor platform.

14 Claims, 19 Drawing Sheets

(51) Int. Cl.
    *B63H 19/08*     (2006.01)
    *B63G 8/08*     (2006.01)
    *B62D 57/032*     (2006.01)

(52) U.S. Cl.
    CPC .......... *B63H 19/08* (2013.01); *B63B 2211/02* (2013.01); *B63G 2008/005* (2013.01); *Y10S 901/01* (2013.01); *Y10S 901/15* (2013.01); *Y10S 901/28* (2013.01); *Y10S 901/47* (2013.01)

(56) References Cited

FOREIGN PATENT DOCUMENTS

| JP | H08-334593 | A | 12/1996 |
|---|---|---|---|
| JP | 2005-178437 | A | 7/2005 |
| JP | 2009-121628 | A | 6/2009 |
| JP | 2011-210432 | A | 10/2011 |
| KR | 1989-0002990 | A | 4/1989 |
| KR | 10-1990-0003489 | | 3/1990 |
| KR | 10-2011-0052102 | | 5/2011 |
| KR | 10-2012-0117220 | A | 10/2012 |
| KR | 10-2013-0068045 | A | 6/2013 |
| KR | 2013-068430 | A | 6/2013 |
| KR | 10-2014-0010518 | A | 1/2014 |
| KR | 10-2015-0105089 | A | 9/2015 |
| WO | WO 84/03869 | A1 | 10/1984 |

OTHER PUBLICATIONS

KIPO Notice of Allowance, with English translation, dated Dec. 25, 2016, for corresponding Korean Patent Application No. 10-2016-0073416 (4 pages).

Partial English Translation of relevant parts of KR 1989-002990 A dated Apr. 12, 1989, listed above (1 page).

Tanaka et al, "Design Concept of a Prototype Amphibious Walking Robot for Automated Shore Line Survey Work," IEEE 2004, pp. 834-839.

Partial European Search Report issued in corresponding European Application No. 16200909.6-1751, dated Jun. 22, 2017, 9 pages.

\* cited by examiner (a)  (b)

(a)   (b)

(a)

(b)

GLASS SPHERE TYPE PRESSURE HOUSING INCLUDING TITANIUM BAND AND A MULTI-JOINT UNDERWATER ROBOT SYSTEM FOR DEEP SEA EXPLORATION USING THE SAME

CROSS-REFERENCE TO RELATED APPLICATION

This application claims priority to Korean Patent Applications No. 10-2016-0073409 and No. 10-2016-0073416 filed on Jun. 13, 2016, and all the benefits accruing therefrom under 35 U.S.C. §119, the contents of which is incorporated by reference in its entirety.

BACKGROUND OF THE INVENTION

1. Field of the Invention

The present invention relates to a deep-sea exploration multi-joint underwater robot system and a pressure housing. In particular, the present invention relates to a deep-sea exploration multi-joint underwater robot system, and a spherical glass pressure housing which includes a titanium band and is capable of withstanding a deep-sea water pressure and shielding built-in equipment from possible intrusion of seawater for allowing to transmit marine research data and underwater status data, wherein the system utilizes a multi-joint underwater robot which is configured to probe the sea floor with the minimum area to support, is capable of standing still with deep-sea legs, changing posture, walking and swimming, includes a depressor system for offsetting the weight of a primary underwater cable connected to a mothership, and is linked with a depressor by a secondary underwater cable.

2. Description of the Related Art

The sea holds 99% of space for the life on earth, 85% of which is deep sea and the exploration of around 1% is not made now.

Presently, only some limited countries including the United States, France, South Korea, Japan and Germany own unmanned submersibles capable of performing science exploration as deep as 6,000 m. All such unmanned deep-sea submersibles developed and operated to date are of screw-propelled submersible types.

In general, underwater robots can be classified by assignment into an autonomous unmanned submersible for principally exploring a wide range and a remote unmanned submersible or remotely-operated vehicle (ROV) to perform a high-precision operation in a relatively narrow area, where most of the underwater robots utilize the propeller as a propulsion device.

The propeller has been used for a long time as underwater propeller and its theory of propulsion mechanism is well established, and it has a higher efficiency in particular applications.

However, in a close on-the-spot survey of the deep sea, which consists of sediments, the propeller often has an issue of vortex flow to disturb the seabed, and a landing on the ocean floor for a close investigation requires a certain period of time until the mud subsides from tumult by the propeller flow, which renders the exploration difficult when an urgent observation is needed for a moving life and the like.

Other forms of undersea robots utilize a caterpillar or track and a plurality of legs rather than using the screw propulsion.

As part of biomimicry study, a obster robot has been developed [Joseph, A. (2004). "Underwater walking", Arthropod Structure & Development Vol 33, pp 347-360.]. The study analyzed the kinematic structure of the lobster and its walking behavior, and implemented artificial muscle actuators, and a central controller based on command neuron.

Said robot focuses on research of biomimicry awareness and study of walking rather than the actual work. Underwater robot is also referred to as unmanned underwater vehicle (UUV), and roughly divided into autonomous unmanned vehicle (AUV) and remotely-operated vehicle (ROV).

Autonomous unmanned submersible is mainly used in scientific research and navigation over the region spanning a few hundred meters to several hundred kilometers. Most of the AUVs, which has been developed to date, have been used in scientific research and military purposes.

ROVs are utilized in the seabed surveys and precision work with the positional accuracy of a few tens of centimeters or less. The ROVs are utilized in a variety of works, including burying submarine cable, submarine pipeline, maintenance of seabed structures, and the like.

The application fields of the ROV can be summarized as follows.

First, the ROVs are used for exploration and salvage of sunken ships and the prevention of oil spill by sunken ships. Second, their applications are marine scientific research, and the exploration and development of marine resources. Third, ROVs are used for seabed structure installations, and for research support and maintenance. Fourth, they are utilized for military purposes, such as mine exploration, mine removal among others.

The ROVs for underwater missions get their mobility roughly in two forms.

First, screw propulsion is effective in the cruising types of AUVs, but it hardly achieves the stability of control in the ROVs that require operating precision. This is because the fluid force is non-linear acting on the ROV underwater and the thrust also involves strong inherent nonlinearity, such as a dead zone, delayed response, and saturation.

Second, track propulsion systems are difficult to run about an irregular seabed terrain and an area with obstacles and they have an inherent disadvantage from their running behavior that interferes with the seabed.

The seabed has ever-present constraints of a variety of obstacles such as sunken ships, fisheries, ropes and abandoned fishing nets, and constraints of seabed topography such as reef, soft ground and the like, which obstructs the track propulsion systems from running properly.

In addition, the track or caterpillar propulsion systems cannot match the intricacies of the application of in-situ survey that needs to be done with minimal interference in unobstructed environment, which is often the case with seafloor investigation.

In other words, the technical limitations or deficiencies of existing submarine operations can be summarized as follows.

When divers themselves participate in the operation, they are vulnerable to safety issues due to various risks, including decompression illness.

A diver's time underwater to work without decompression is limited to 30 minutes in 21-meter water depth, and to 5 minutes in 40-meter depth.

The ever-present danger of a variety of obstacles such as sunken ships, fisheries, ropes and abandoned fishing nets, and irregularities of seabed topography such as reef, soft ground and the like, interfere with the work of the divers, and pose life-threatening situations.

Underwater robots with the propeller or caterpillar propulsion systems inevitably interfere with the seafloor. The seafloor investigations often need to be carried out in environments uninterfered.

The screw-propelled ROVs for underwater operations have issues such as limited precise positioning capability that is needed for a precision exploration of slopes, rugged terrain, etc.

Conventional ROVs suffer from positional constraints in slope explorations that they need to be seated on the slope for properly conducting operations such as precision exploration and sampling. Conventional ROVs also need to move or hover at a constant altitude for continuous seafloor survey.

On the other hand, to prevent structural destruction due to deformation and stress under the internal pressure and external pressure conditions and to secure a structural safety under any circumstances, conventional pressure containers or housings are designed and fabricated pursuant to specific standards (for example, KS B 6750) by specifying the thickness, length, radii of an inner container and an outer container, welding condition, and molding conditions or the like.

Thus, the top priority of the structural safety requires a pressure housing to be made of a single continuum (i.e., integrated structure).

Accordingly, the present inventors have devised and realized a seamless or integral robot body including a frame free of separate coupling fixtures except for those exclusive for leg attachments and cylindrical pressure housings for the sake of structural safety of the system; and, as an accompaniment, multiple pressure housings for enabling a multi-joint underwater robot and a depressor to withstand the water pressure of the deep sea, for shielding built-in appratuses from seawater intrusion through waterproofing, and for allowing marine research data and underwater state data to be transmitted to a mothership.

In addition, the present inventors have devised a seamless integral robot body formation capable of maintaining an exact location even in the harsh subsea topographic exploration across slopes, rugged terrain, etc., with the free swimming ability for continuous seafloor survey without the passel to necessarily maintain a constant altitude, as well as including a frame free of separate coupling fixtures other than those exclusive for leg attachments and cylindrical pressure housings for the purpose of structural safety of the pressure housings.

As prior arts, there are Tanaka, T., Sakai, H., Akizono, J. (2004). "Design concept of a prototype amphibious walking robot for automated shore line survey work", Oceans '04 MTS/IEEE Techno-Ocean '04, pp 834-839, JP 1996-334593 A and JP 4820804 B2.

SUMMARY OF THE INVENTION

It is an object of the present invention to complement the deficiencies of a conventional screw-propulsion system and the endless track system by providing a deep-sea exploration multi-joint underwater robot system which probes the sea floor with the minimum area to support, is capable of standing fixed and changing posture using deep-sea legs, and by moving by walking and swimming, allows a stable, close seabed surface exploration to be performed continuously even in sloped and rugged terrains.

In addition, the present invention according to some embodiments seeks to provide a deep-sea exploration multi-joint underwater robot system including a multi-joint underwater robot and a depressor provided with predetermined pressure housings for allowing the respective units to withstand a deep-sea water pressure at or less than 6,000 meters of water depths and shield their built-in equipment from possible intrusion of seawater to transmit marine research data and underwater status data to a mothership which remotely controls the moving direction of the underwater robot.

Further, the present invention seeks to provide a spherical glass pressure housing which includes a titanium band and utilizes a lightweight glass hemisphere for enabling subsea operated exploration equipment of a multi-joint underwater robot and a depressor to withstand a deep sea water pressure, shielding built-in apparatuses from seawater intrusion and water pressure through waterproofing, and allowing marine research data and underwater state data to be transmitted to a mothership.

In order to achieve these objects, the present disclosure in some embodiments provides a deep-sea exploration multi-joint underwater robot system, comprising: a multi-joint underwater robot configured to have a plurality of first pressure housings and a plurality of second pressure housings for withstanding a deep-sea water pressure and shielding built-in equipment from an intrusion of seawater, to perform a proximity and precision exploration of a seabed terrain while obtaining marine research data to transmit underwater status data; a mothership configured to receive and store the marine research data and the underwater status data, to monitor moving directions of the multi-joint underwater robot, and to control the moving directions; and a depressor configured to have a third pressure housing, to be linked with the mothership by a primary cable and with the multi-joint underwater robot by a secondary cable, and to prevent a water resistance of the primary cable from being transmitted to the multi-joint underwater robot, wherein the plurality of first pressure housings have a spherical formation and are mounted on a robot body frame of the multi-joint underwater robot, the plurality of second pressure housings have a cylindrical formation and are mounted between a plurality of left and right legs, respectively, and the third pressure housing has a cylindrical formation and is mounted in a platform of the depressor.

Another embodiment of the present invention provides a spherical glass pressure housing, for use in an underwater exploration system, including a titanium band, a multi-joint underwater robot, a depressor and a mothership, the spherical glass pressure housing including: a plurality of first pressure housings and a plurality of second pressure housings configured to enable the multi-joint underwater robot to withstand a deep-sea water pressure and to shield built-in equipment from an intrusion of seawater; a third pressure housing configured to enable the depressor to withstand a deep-sea water pressure and to shield built-in equipment from an intrusion of seawater; and a pressure-resistant sphere configured to include a band of a titanium material and of a predetermined height, interposed between a pair of glass hemispheres that applies to a battery installed on the multi-joint underwater robot, wherein the plurality of first pressure housings have a spherical formation and are mounted on a robot body frame of the multi-joint underwater robot, the plurality of second pressure housings have a cylindrical formation and are mounted between a plurality of left and right legs, respectively, and the third pressure housing has a cylindrical formation and is mounted in a platform of the depressor.

As set forth above, according to the present invention, a deep-sea exploration multi-joint underwater robot system probes the sea floor with the minimum area to support to minimize the disturbance of the deposited soil of deep seafloor, and is capable of standing still with deep-sea legs and changing posture of the system, thus stable and high-precision underwater operations can be achieved.

In addition, the deep-sea exploration multi-joint underwater robot system of the present invention is capable of performing stable and high-precision operations even at the complex seafloor topography such as slopes, rugged terrain, etc. In addition, the capability of the system to travel by walking about the seafloor allows an extra close and continuous exploration of the seafloor as well as long-term observation survey through a wired and wireless hybrid communication system.

In addition, the pressure housing is of a spherical design for minimizing the buoyancy material to be used with an interconnection design of two left and right legs resulting in a simplified wiring operation and an improved maintainability and promoting the structural safety of the pressure housing and shortening the production time of the system.

Moreover, a reliable watertightness is ensured through various O-rings, a direct coupling method is used for underwater connectors to bring minimized footprint, reductions in the diameter and in the radius of curvature of the secondary cable and to secure an internal symmetry thereof.

DETAILED DESCRIPTION OF THE INVENTION

Figure 1:
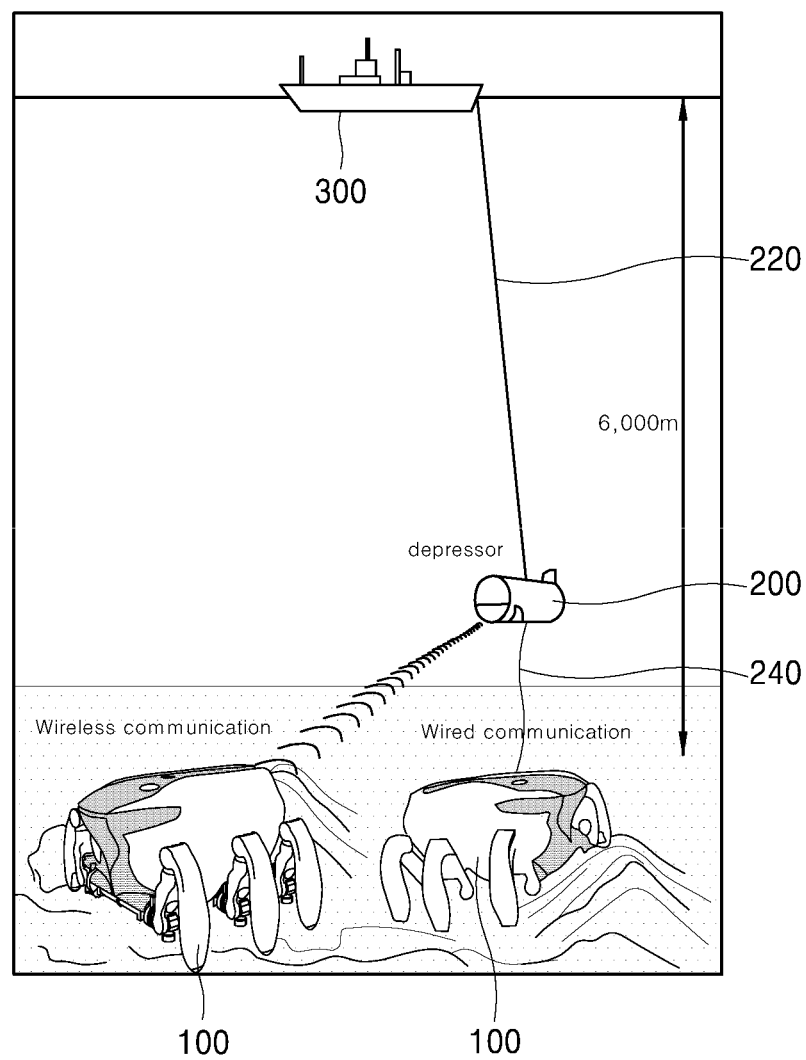
FIG. 1 is a schematic conceptual diagram of a deep-sea exploration multi-joint underwater robot system according to an embodiment of the present invention.

Advantages and features of the present invention, and methods of accomplishing the same will become more apparent with reference to embodiments to be described in detail in conjunction with the appended drawings. However, the present invention is not limited to the embodiments set forth herein, which are intended to be embodied in many different forms. The embodiments are solely presented for a more complete disclosure of the present invention and are intended to provide the complete scope of the invention to those skilled in the art to which this invention pertains. The present invention is solely defined by the claim category. Throughout the descriptions, like reference numerals designate like elements, although the elements are shown in different drawings.

Exemplary embodiments of the present disclosure will be described in detail below with reference to the accompanying drawings.

FIG. 1 is a schematic conceptual diagram of a deep-sea exploration multi-joint underwater robot system, according to some embodiments of the present invention, which includes a multi-joint underwater robot 100, a depressor 200 and a mothership 300.

Referring to FIG. 1, a deep-sea exploration system in an embodiment of the present invention, which is depth rated to 6,000 meters and capable of complex movement functions, is illustrated as arriving at 6,000-meter deep seabed and travelling by walking and swimming.

The depressor 200 is linked via a primary cable 220 to the mothership 300, and the multi-joint underwater robot 100 is linked via a secondary cable 240 to the depressor 200 for enabling the multi-joint underwater robot 100 to withstand the weight of the primary cable 220 underwater and its tension while buffering the effect of the vertical movement of the mothership 300, to ensure unhindered mobility of the underwater robot 100.

In addition, the multi-joint underwater robot 100 may be made immobilized for its deployment and recovery. In operation, multiples of the multi-joint underwater robot can mutually observe through their installed cameras, and underwater robot is equipped with devices capable of underwater location tracking in the 6,000 meters water depth.

The depressor 200 and the multi-joint underwater robot 100 are operated by a wired and wireless hybrid communication system that carries out wired communications as well as wireless communications with the mothership 300.

That is, the mothership 300 and the depressor 200 are interconnected by the primary cable 220 while the depressor 200 and the underwater robot are interconnected by the secondary cable 240 so that the relevant parties may operate in a wired system, or in another embodiment, the mothership 300 and the depressor 200 are interconnected by the primary cable 220 while the depressor 200 and the underwater robot are operated in a wireless manner through the wireless communication free of a wire cable.

The deep-sea exploration system using the multi-joint underwater robot 100 capable of the complex-movement and depth rated at 6,000 meters has been designed for deep-sea environment with almost no tide running, yet the depressor 200 is contemplated to serve to minimize the impact of the weight of the tether cable on the robot.

In some embodiments, the deep-sea exploration system having the aforementioned arrangement of at least the multi-joint underwater robot 100, depressor 200 and mothership 300 establishes the effective system for observing the seafloor topography, while obtaining the topography data by controlling the multi-joint underwater robot 100.

The deep-sea multi-joint underwater robot 100 minimizes the disturbance of the deposited layer of the deep sea, prevents its robot feet or arms from sinking in the seabed soil, and has a buoyancy control function to swim about.

In some embodiments, the deep-sea exploration system has the following two assignments.

Deep-Sea Marine Science Research

This assignment is to obtain scientific research data needed for ocean physical, chemical, biological, and geological researches and the like while minimizing seabed disturbance in the deep-sea environment with soft ground that consists of sedimentary soil.

Sampling is performed on organisms, the soil, seawater and the like in the seabed up to 6,000-meter depth as needed for the scientific research.

Long-Term Precision Seabed Survey

This assignment is to carry out a close precise exploration of irregular seabed topography such as submarine hydrothermal deposits. In a wireless autonomous control mode, the deep-sea exploration system operates alone without the depressor 200, performing long-term observation of a predetermined area while minimizing its energy consumption.

The present invention tackles issues with the conventional screw-propelled submersible vehicles by providing the underwater robot of a different, unprecedented concept as detailed below.

Regarding safety, in the dangerous environment for divers to work in person, the underwater robot 100 performs as the divers' substitute. As for working time, utilizing the underwater robot 100 overcomes the limitations of the dive time of the divers.

The placement of the depressor 200 between the underwater robot 100 and mothership 300 reduces the force of a current on the cable to neutralize its effect on the seabed robot 100.

With respect to obstacles and the irregular seafloor topography, the seabed robot of some embodiments uses the multiped arrangement to autonomously perform landing on the seabed not to be caught in obstacles and to maintain its static stability, and it uses the multi-joint legs to ambulate while maintaining a proper posture even in the irregular seafloor terrain.

Against environmental interference, the seabed robot of some embodiments moves and works in such method of seabed walking as to minimize the disturbance of the seabed.

The underwater robot 100 in some embodiments differs from the existing screw-propelled underwater robots by its conceptually advanced legs including a plurality of joints for allowing the robot to move by walking and swimming close to the seabed.

The concept of this underwater robot 100 is to mimic the manner of behavior of a crab or lobster moving and working on the seabed, so the inventors have named the same robot "Crabster CR6000".

Figure 2:
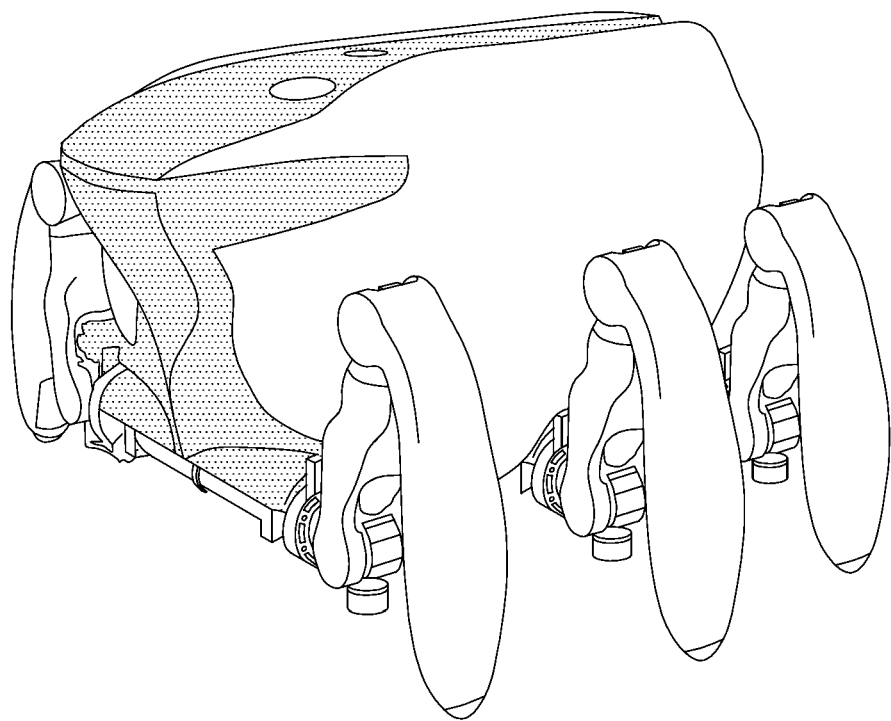
FIG. 2 is an exterior photograph of a multi-joint underwater robot in the deep-sea exploration system shown in FIG. 1 with the robot body assembled with legs.

FIG. 2 is an exterior photograph of the multi-joint underwater robot 100 in the deep-sea exploration system shown in FIG. 1 with the robot body assembled with legs.

Figure 3:
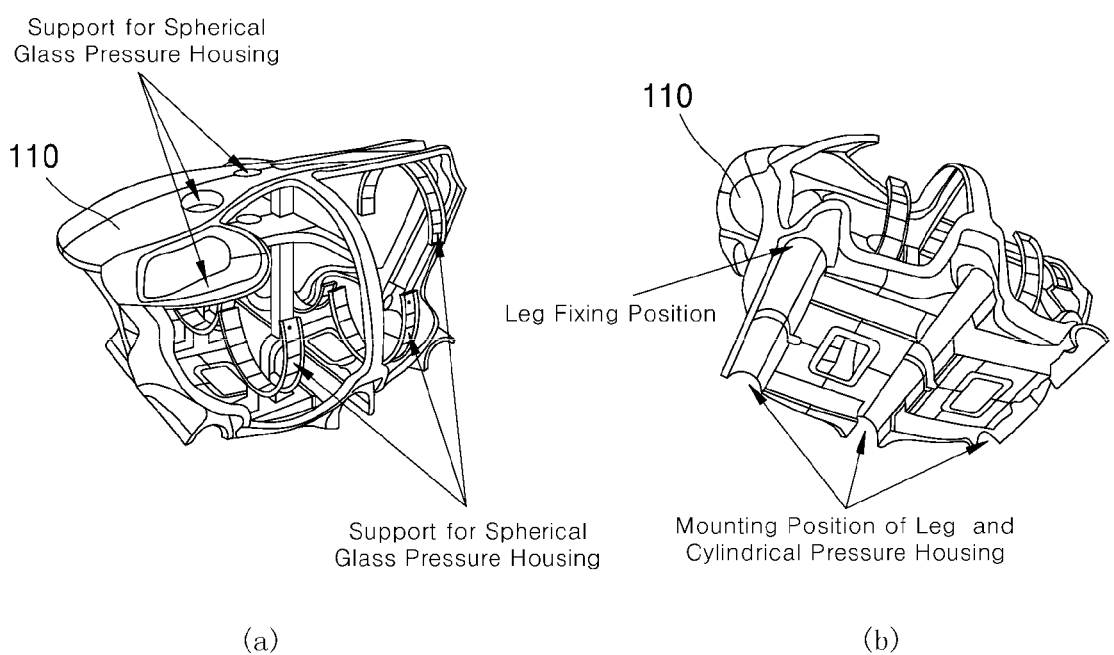
FIG. 3 is a top perspective view and a bottom perspective view of a robot body frame of the multi-joint underwater robot shown in FIG. 2.

FIG. 3 is a top perspective view and a bottom perspective view of a robot body frame 110 of the multi-joint underwater robot 100 as shown in FIG. 2.

Figure 4:
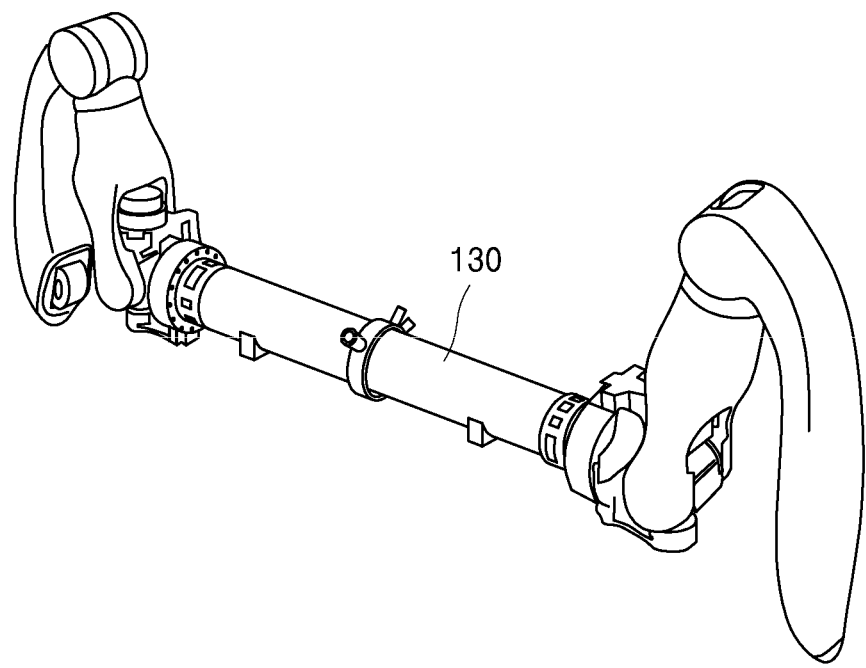
FIG. 4 an exterior photograph of legs assembled with a cylindrical pressure housing 130 of the multi-joint underwater robot 100 shown in FIG. 2.

FIG. 4 an exterior photograph of legs assembled with a cylindrical pressure housing 130 of the multi-joint underwater robot 100 as shown in FIG. 2.

Figure 5:
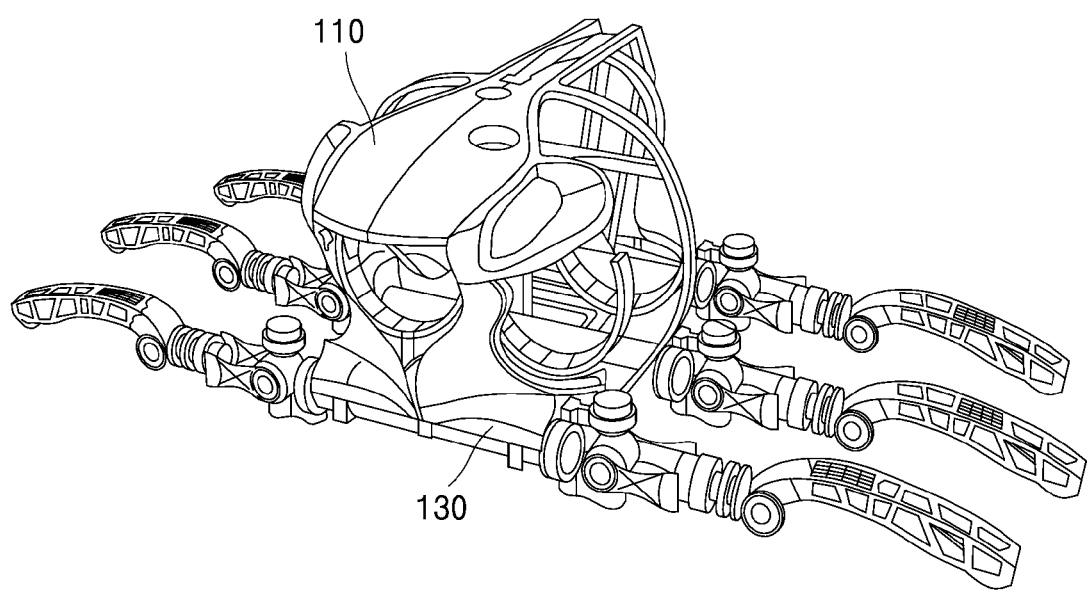
FIG. 5 is a perspective view of a connected structure of a robot body frame 110, cylindrical pressure housings 130 and legs of the multi-joint underwater robot 100 shown in FIG. 2.

FIG. 5 is a perspective view of connected structure of a robot body frame 110, cylindrical pressure housings 130 and the legs of the multi-joint underwater robot 100 shown in FIG. 2.

Figure 6:
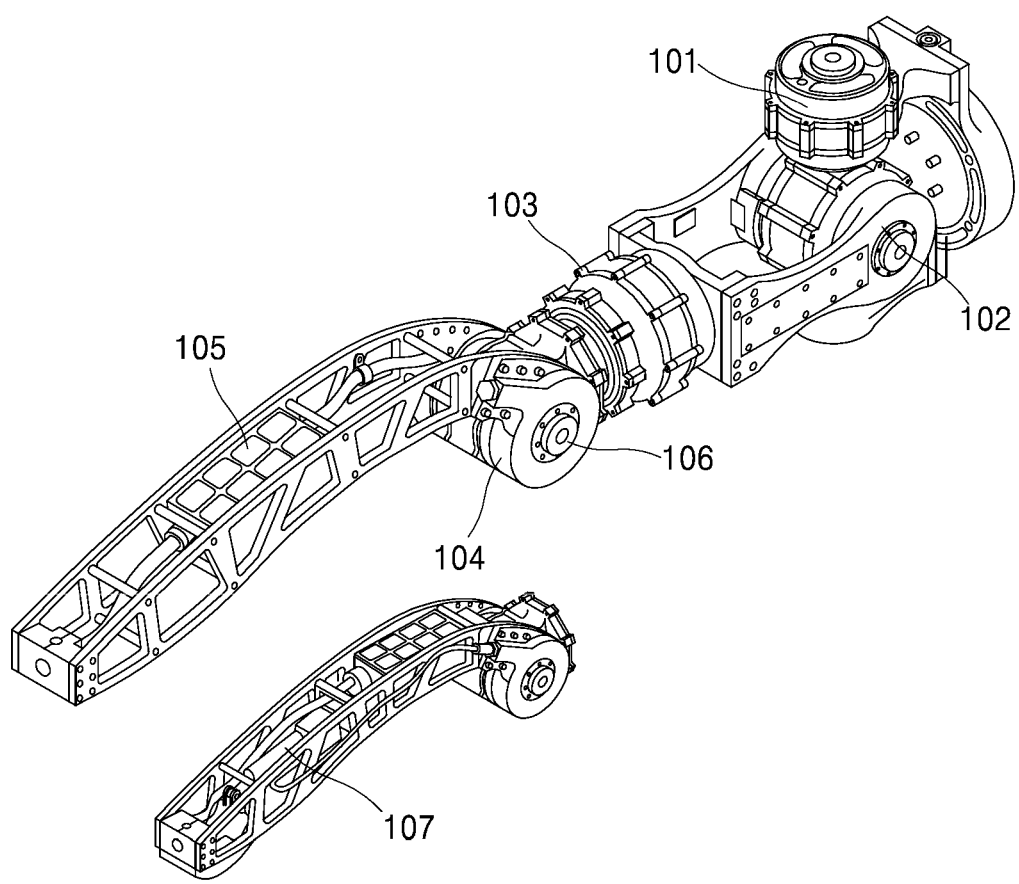
FIG. 6 is a perspective view of an oil-filled type deep-sea leg of the multi-joint underwater robot 100 shown in FIG. 2, and a robot arm that may be used as a leg.

FIG. 6 is a perspective view of an oil-filled type deep-sea leg of the multi-joint underwater robot 100 as shown in FIG. 2, and a robot arm that may be used as a leg, including first to fourth joints 101 to 104, a hydraulic compensation rubber packing 105, a membrane 106 and a gripper 107.

Figure 7:
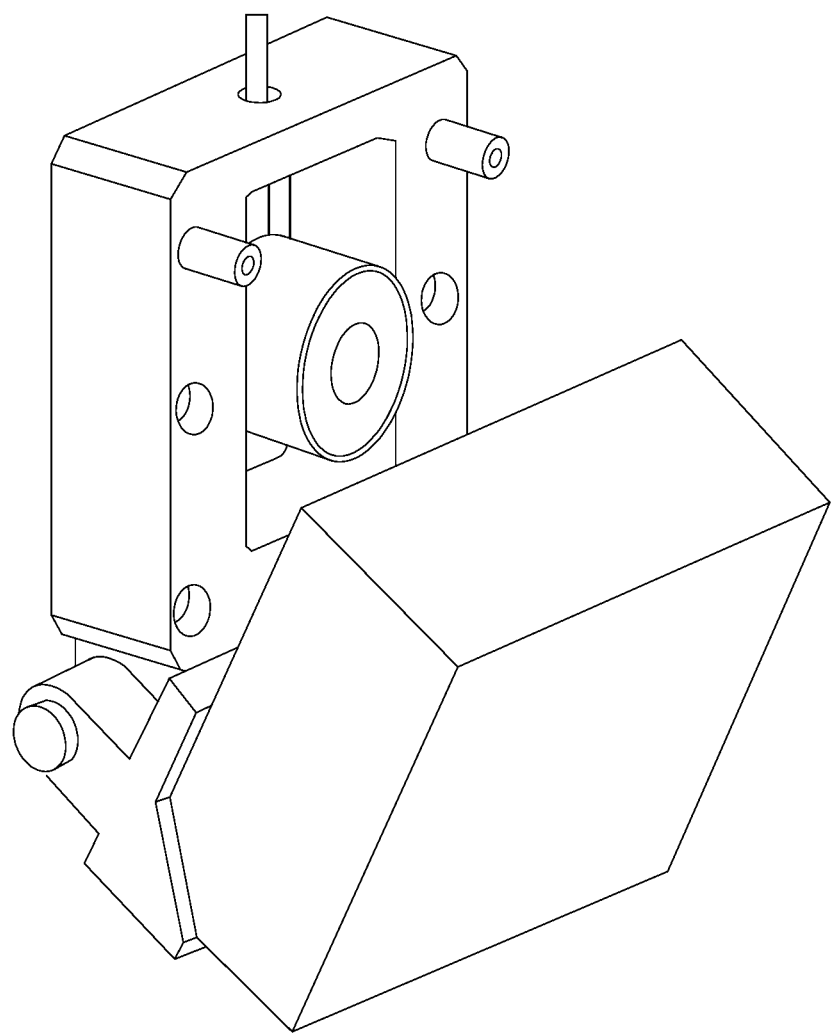
FIG. 7 is a perspective view of a buoyancy control device of the multi-joint underwater robot 100 shown in FIG. 2.

FIG. 7 is a perspective view of a buoyancy control device of the multi-joint underwater robot 100 as shown in FIG. 2.

Referring to FIGS. 1 to 7, the following describes the structure and functions of a multi-joint underwater robot in a deep-sea exploration multi-joint underwater robot system according to at least one embodiment of the present invention.

The deep-sea multi-joint underwater robot 100 of some embodiments is capable of hexapod walking and swimming, mounted with a scanning sonar and a high-resolution optical camera for high-precision exploration, and is equipped with a device capable of underwater location tracking in about 6,000-meter water depth.

As shown in FIG. 6, the underwater robot 100 is equipped with oil-filled type deep-sea legs each having a hydraulic compensation rubber packing 105 and a membrane 106 configured so that the system can withstand a pressure of about 600 bar at 6,000-meter depth in deep water maintaining waterproof capability. The deep-sea leg is configured to include an air bleed valve and a pressure relief valve.

Further, the underwater robot 100 is equipped with an oil-filled type deep-sea robot leg that may be used as an arm, which is structurally identical to the oil-filled type deep-sea leg, wherein and the gripper 107 is mounted thereon for interchangeable use as a robot arm during underwater operations.

Meanwhile, the deep-sea multi-joint underwater robot 100 according to some embodiments is provided with a bottom-mounted buoyancy control device of the electromagnet type as shown in FIG. 7 for controlling the buoyancy of the underwater robot in operation, and is equipped with a battery for wireless operation thereof.

Robot Body Frame 110

First, the robot body frame 110 adopts a carbon composite material for a weight reduction and high rigidity of the underwater robot 100, and it is installed with a fixing frame for mounting the spherical first pressure housings 120.

In addition, the robot body frame 110 is fabricated as a seamless or integral body form free of separate coupling fixtures except for those exclusive for leg attachments and the cylindrical second pressure housings 130 for the sake of structural safety of the system.

Additionally, for increased rigidity, the robot body frame 110 undergoes a spinning deposition of carbon fibers along the fiber direction, it is reinforced at the coupling portions and the stress concentration sites with predetermined increases of the thicknesses.

Legs and Robot Arms

The legs and robot arms of some embodiments are designed to have an oil-filled type articulation link with 6,000-meter water-resistant operating depth, while utilizing aluminum alloy at the mechanism parts for corrosion resistance and mechinability.

The leg has a joint configured to operate with a 4-degree of freedom, and to simplify the system, the robot arm is made just by the application of a gripper to the leg, wherein the gripper is arranged to operate by a linear driver distally of the leg.

The leg and robot arm are provided with a vent hole for oil filling, installment of an oil packing, a membrane and a relief valve for pressure compensation, and a cable path arranged for the internal wiring.

Other arrangements adopted are a frameless motor for weight reduction, a harmonic drive reduction gear for removing backlash, and a geared motor.

A watertight sealing is provided by filling the interior of the leg with transformer or insulation oil and having its attachment portions applied with O-rings of which a double O-ring structure is used for rotating parts, and a sacrificial anode of magnesium material for corrosion resistance is attached to the leg.

Body and Leg Linkage

A body and leg linkage according to some embodiments is structured so that the robot body frame 110 mounts pressure housing assemblies by their flanges, to establish a connection from a leg base through the pressure housing flange to a robot body frame flange.

The robot body frame 110 and the second pressure housing 130 of the cylinder type are arranged to support the leg at the same time, and their connections are achieved by bolting to tabs which are arranged annually along the flange of the robot body frame.

The exteriors of the robot body and the legs are in streamlined designs for a reduced fluid resistance, in consideration of the protection of the frame, reduction of flow resistance, the shape in consideration of the complement of mechanical rigidity, utilizing fiber reinforced plastics (FRP) as their material.

Figure 8:
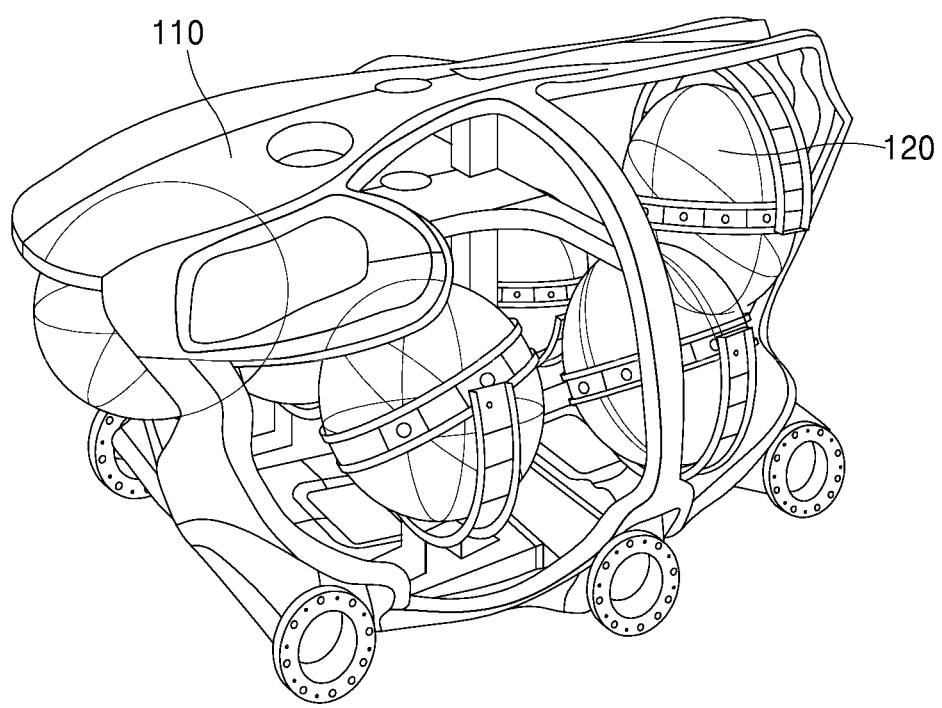
FIG. 8 is a perspective view of a robot body frame and spherical pressure housings mounted on a connected structure of the robot body frame as shown in FIG. 5, spherical pressure housings and legs.

FIG. 8 is a perspective view of a robot body frame 110 and spherical first pressure housings 120 mounted on a connected structure of the robot body frame 110 as shown in FIG. 5, the spherical first pressure housings 120 and the legs.

Figure 9:
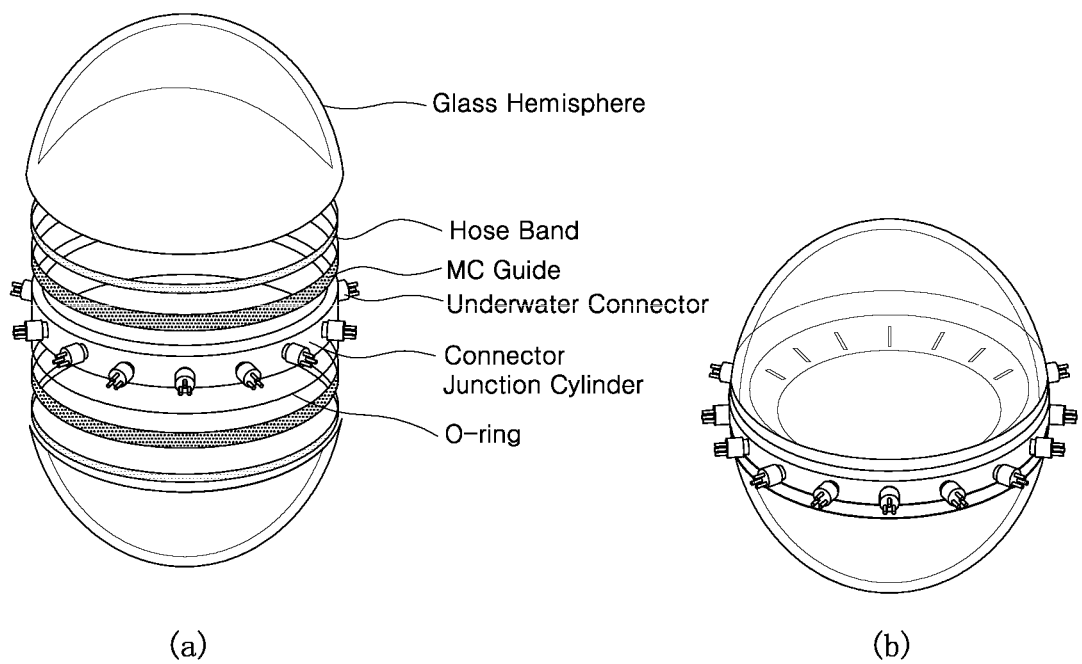
FIG. 9 is an exploded perspective view (a) and perspective view (b) of a spherical pressure housing to be mounted on the connected strucutre of the robot body frame as shown in FIG. 5, the spherical pressure housings and the legs.

FIG. 9 is an exploded perspective view (a) and perspective view (b) of the spherical first pressure housing 120 to be mounted on the connected structure between the robot body frame 110 as shown in FIG. 5, the spherical first pressure housings 120 and the legs.

Figure 10:
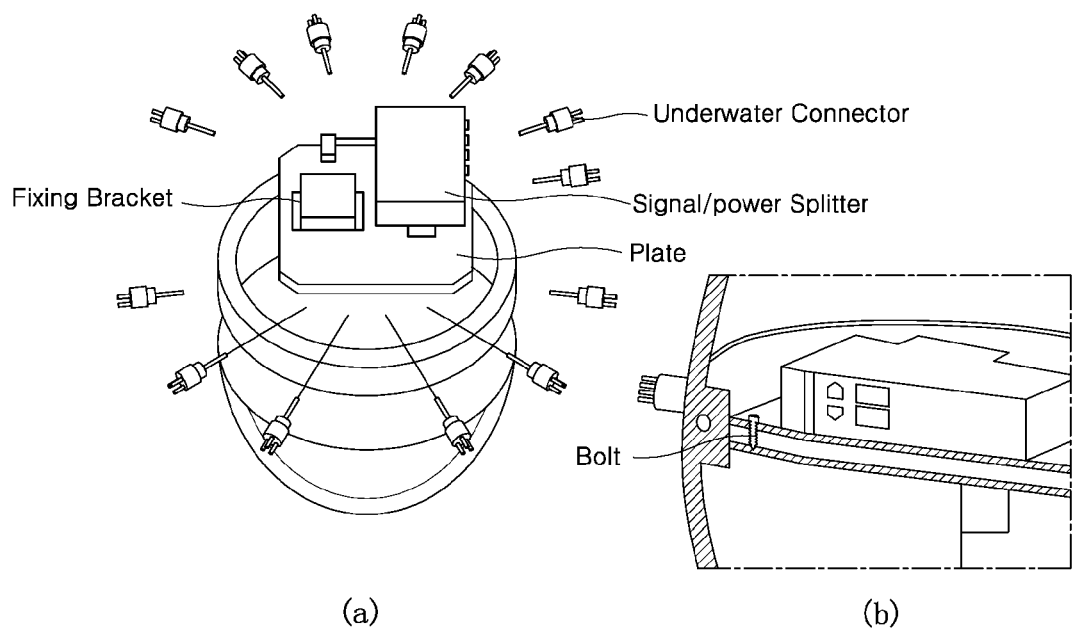
FIG. 10 is an exploded perspective view (a) of a method of fixing internal equipment of the spherical pressure housing shown in FIG. 9, and a see-through perspective view (b) of the spherical pressure housing after completing the fixing.

FIG. 10 is an exploded perspective view (a) of a method of fixing internal equipment of the spherical first pressure housing 120 shown in FIG. 9, and a see-through perspective view (b) of the spherical first pressure housing 120 after completing the fixing.

Each spherical first pressure housing 120 of some embodiments is depth rated at 6,000 meters and has built-in equipment including a HD camera, various electrical/electronic components such as motor/junction box, illumination device, etc. and a battery.

The first pressure housing 120 has a spherical design, and is formed of a pair of commercial pressure-resistant glass hemispheres to minimize weight.

The spherical first pressure housing 120 of some embodiments includes a connector joint cylinders for mounting a plurality of underwater connectors, fitting portions for preventing damages to the pressure-resistant glass hemispheres; and a jig fixture for mounting equipment internally of the pressure housing.

The glass hemispheres of the pressure housing for mounting a camera a permeability and is polished for transparency or permeability and anti-distortion treatment.

In addition, the spherical first pressure housing 120 of some embodiments withstands 600 bar pressure in the deep sea at 6,000-meter water depth, has the waterproofing capability, has a light weight of the glass sphere material and a high level of buoyancy of the internal volume of the glass sphere. The glass hemispheres have a titanium band having a polygonal contour for mounting underwater connectors for powering internally mounted electrical and electronic devices and for making equipment to equipment communications.

In this case, the exterior polygonal contour of the titanium band has outer polygonal faces which can be extended as required and can be mounted with the underwater connectors.

Figure 11:
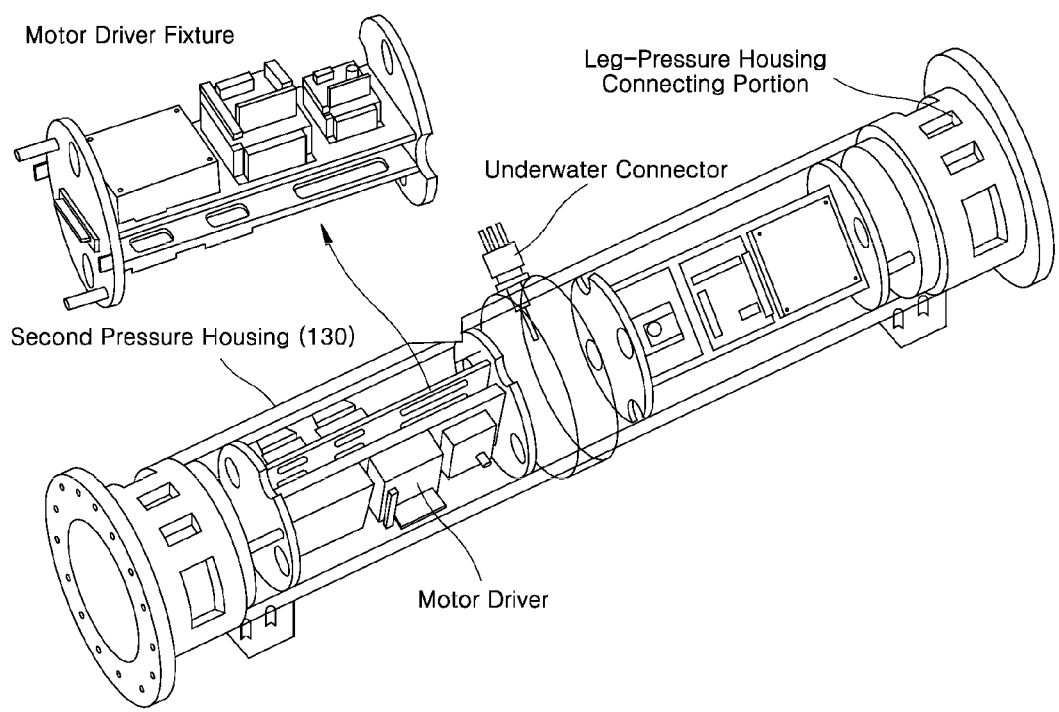
FIG. 11 is a see-through perspective view of the cylindrical pressure housing as shown in FIG. 4 for use in a multi-joint underwater robot.

FIG. 11 is a see-through perspective view of the cylindrical second pressure housing 130 as shown in FIG. 4 for use in the multi-joint underwater robot 100.

The cylindrical second pressure housing 130 of the multi-joint underwater robot 100 according to some embodiments has a motor driver fixture jig adapted to mount a motor driver for driving the oil-filled type deep-sea legs and the robot arms. The cylindrical second pressure housing 130 is designed to link two legs, right and left, thereby providing simplified wiring and improved maintainability.

The legs and the pressure housing have connecting portions which include titanium flanges adapted to fix the legs and the pressure housing to the robot body frame 110, and the interconnections between the leg bases and pressure housing are made through underwater connectors that are directly coupled for minimized connecting space.

Figure 12:
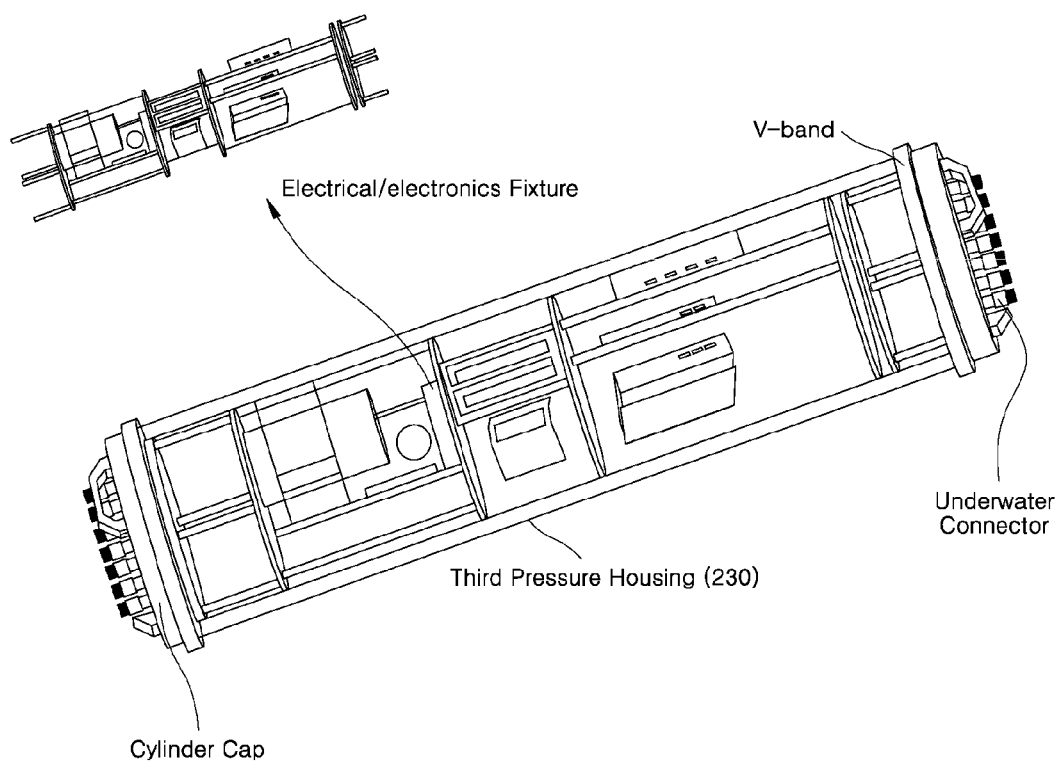
FIG. 12 is a see-through perspective view of a cylindrical pressure housing mounted on a depressor in the deep-sea exploration system, shown in FIG. 1.

FIG. 12 is a see-through perspective view of a cylindrical third pressure housing 230 mounted on the depressor 200 in the deep-sea exploration system, shown in FIG. 1.

The cylindrical third pressure housing 230 to be mounted on the depressor 200 of some embodiments is adapted to mount an electrical/electronic interface of the depressor 200. The cylindrical third pressure housing 230 is preferably made of a titanium material, and it is designed by complying to ABS rules and using commercial analysis tools.

Watertightness is ensured by inserting O-rings at the contact surfaces between flange portions of cylinder caps and the cylinder inner walls, and connection portions between the third pressure housing 230 and the cylinder caps are fastened by using V-bands, each cylinder cap being installed with a plurality of underwater connectors.

Figure 13:
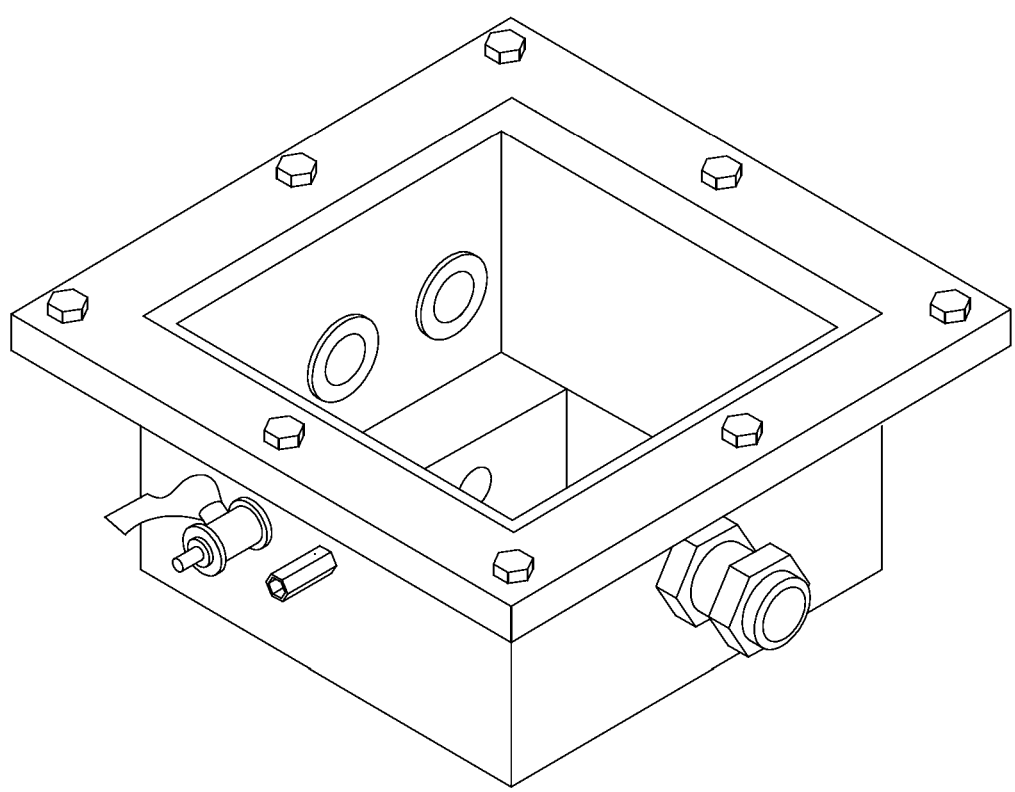
FIGS. 13 to 15 are see-through perspective views of pressure-resistant water-tight junction boxes in the deep-sea exploration system shown in FIG. 1.
Figure 14:
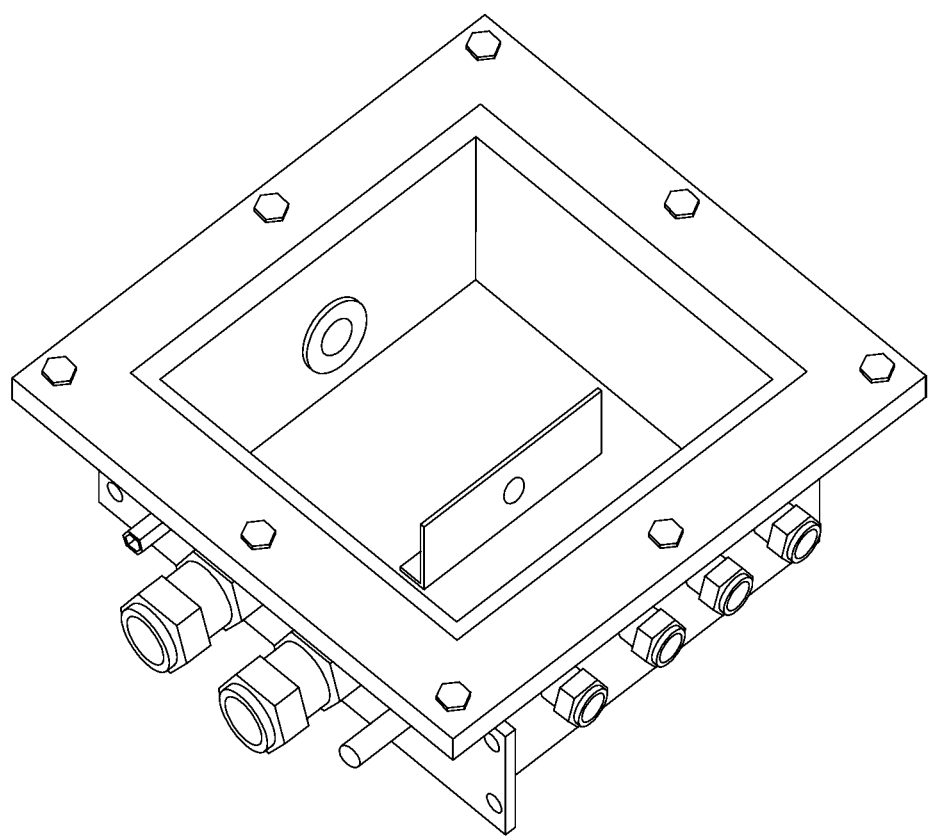
Figure 15:
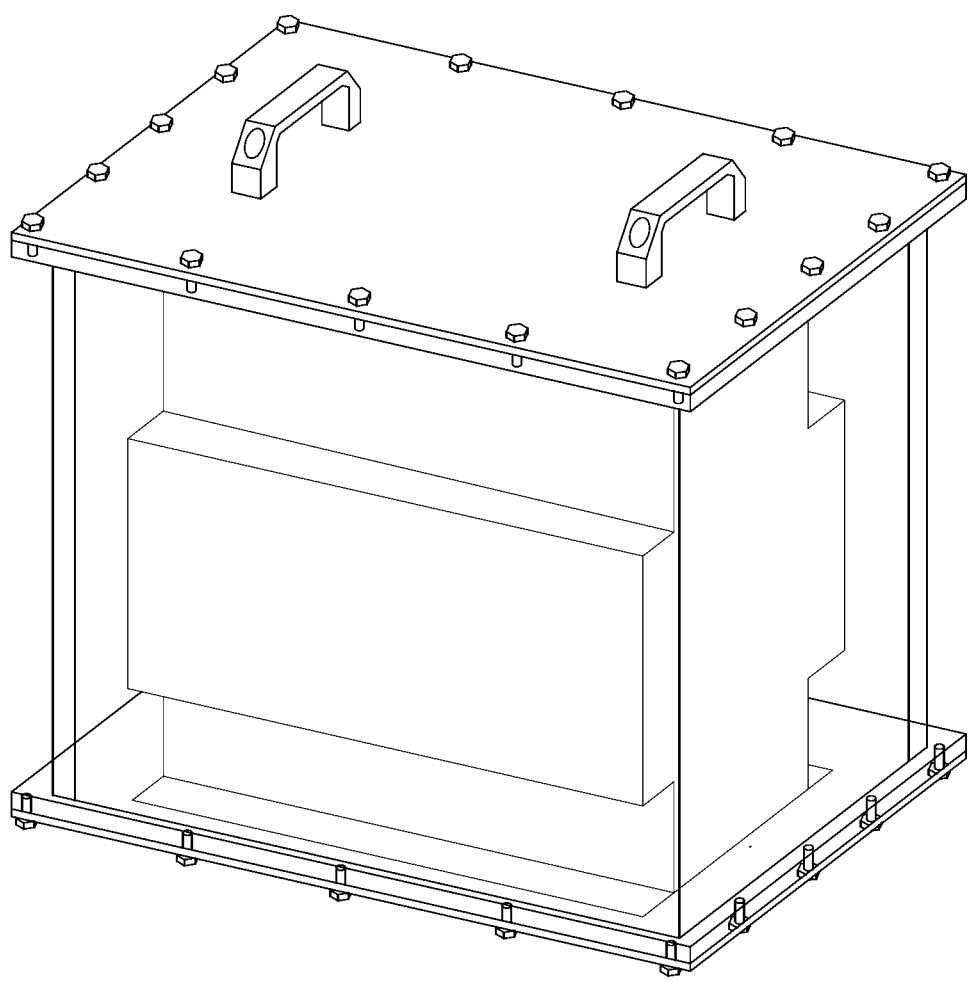

FIGS. 13 to 15 are see-through perspective views of pressure-resistant water-tight junction boxes in the deep-sea exploration system shown in FIG. 1, which include a robot body junction box, a depressor junction box and a transformer box.

Robot Body Junction Box

As shown in FIG. 13, the robot body junction box is adapted to distribute a power supply line, fiber optic cable and Ethernet cable of the secondary cable 240 that is linked with the depressor 200.

The robot body junction box takes the shape of rectangular for the sake of pressure resistance and watertightness, manufacturing and easy assembly. The robot body junction box has an open surface formed of a transparent reinforced plastic material for allowing a status check of a flow rate, and a wiring job, it is fastened by bolting to tabs which are arranged in a circle along the flange of the robot main body frame, and it has a first built-in leak sensor.

Depressor Junction Box

As shown in FIG. 14, the depressor junction box distributes power and communications between the primary cable 220, the depressor 200 and the secondary cable 240.

The depressor junction box is designed to have an oil-filled type structure to have the inner pressure balanced with the outer pressure, which separates the incoming primary cable 220 into a power line and an optical line, and thereby connects the high-voltage power to a transformer, and distributes optical communications to the third pressure housing.

The depressor junction box is installed internally with a rectifier for receiving an electric power which is stepped down back from the transformer and converting the stepped-down electric power to a direct current (DC) power, and a second leak sensor.

Transformer Box

As shown in FIG. 15, the transformer box packages and protects the transformer for converting a high-voltage alternating current (AC) transmitted via the primary cable 220 into a low-voltage AC current.

The transformer box takes a rectangular shape which is made of all-aluminum, and is internally mounted with a third leak sensor.

Figure 16:
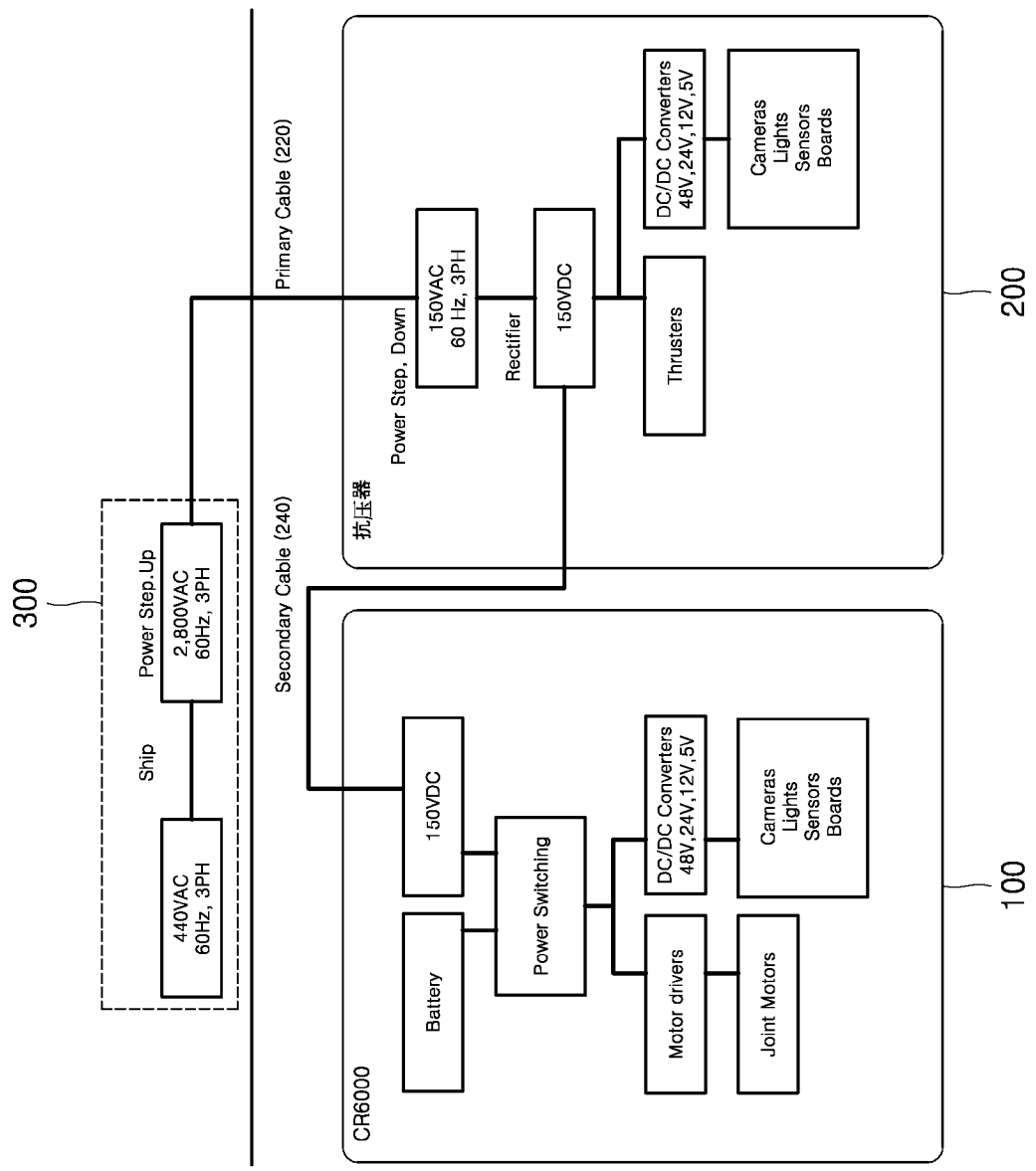
FIG. 16 is a block diagram of power distributing components in the deep-sea exploration system shown in FIG. 1.

FIG. 16 is a block diagram of power distributing components in the deep-sea exploration system as shown in FIG. 1.

Figure 17:
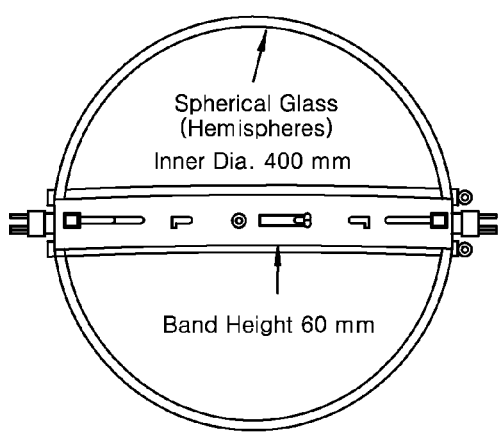
FIG. 17 is a front view (a) and a perspective view (b) of a battery installed in the robot body in the deep-sea exploration system shown in FIG. 1.
Figure 17:
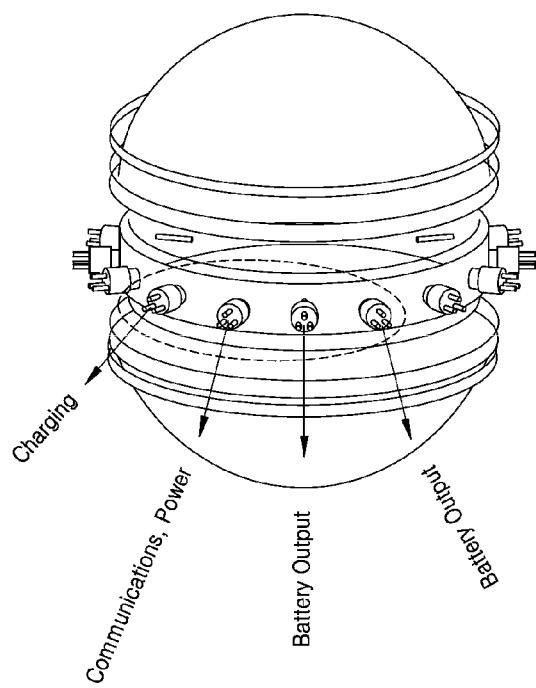

FIG. 17 is a front view (a) and a perspective view (b) of a battery installed in the robot body in the deep-sea exploration system shown in FIG. 1.

Figure 18:
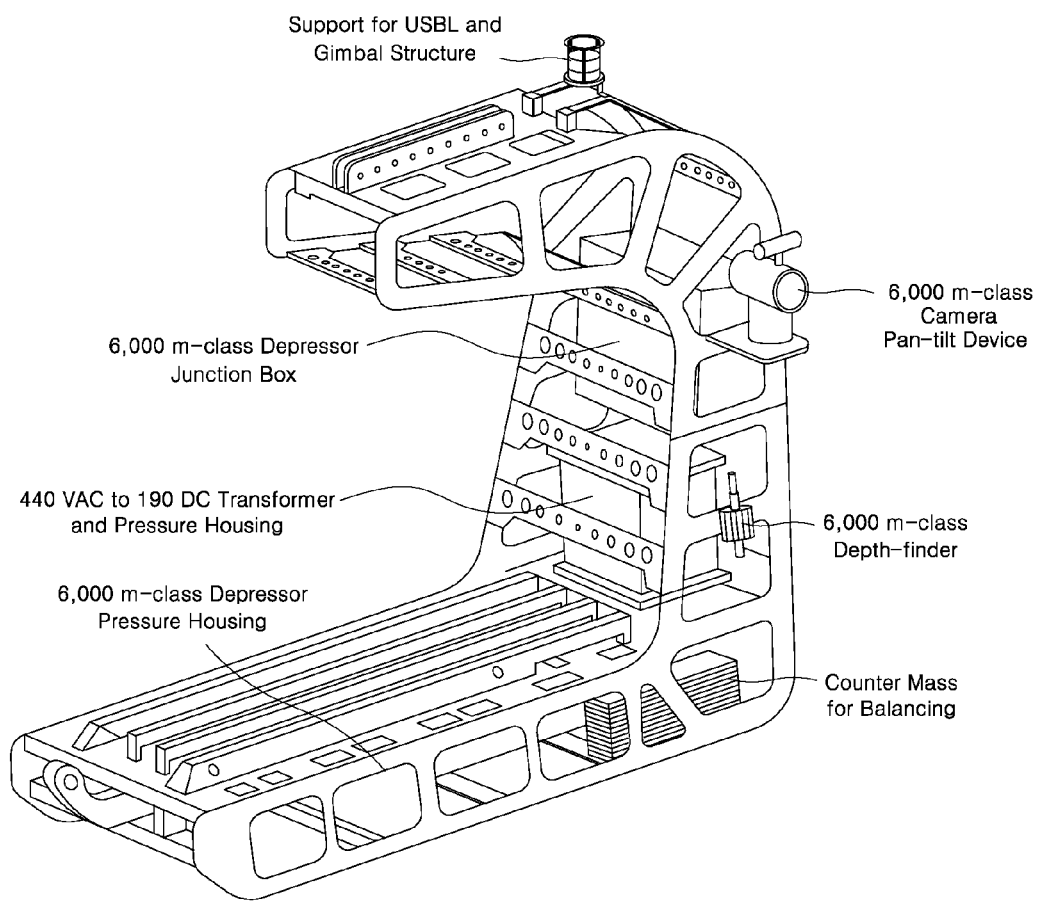
FIG. 18 is a perspective view of a depressor platform in the seabed exploration system shown in FIG. 1.

FIG. 18 is a perspective view of a depressor platform in the seabed exploration system shown in FIG. 1.

As shown in FIG. 16, the primary cable 220 for linking the mothership 300 with the depressor 200 and the secondary cable 240 for linking the depressor 200 with the robot body include a power source and optical communications functionalities, and Ethernet communication cable are further included in the secondary cable 240.

Here, the secondary cable 240 utilizes, for the sake of diameter reduction, a plurality of low-capacity cables which are implemented in a large-capacity cable, while reducing the radius of curvature through centrally placing an optical communication line.

To ensure internal symmetry is secured by the divided arrangement of the Ethernet line, and an inner shielding is added for the cable protection.

A Kevlar structure is applied for an increase in tension, and the outer skin may be replaced with a buoyancy material for increased buoyancy of the secondary cable 240.

In view of the voltage drop by the cable and toward stable robot operations, the mothership 300 side employs a booster to transmit high-voltage 3-phase AC current for providing the 3-phase electric power rated at 440 VAC and 60 Hz which is frequently utilized by research vessels.

The boosted power is transmitted via the primary cable 220 to the depressor 200 which steps down the transmitted power and rectifies the same.

The rectified DC voltage is DC/DC converted appropriately into the required voltages for respective devices, and then transmitted through the secondary cable 240 to the robot body and finally supplied the various mounted devices.

Power Supply and Distribution to Robot Body

The battery is designed and arranged to be built into the robot body so that it is applied with the DC power supply converted by the rectifier in the depressor junction box, so as to cause the robot body to be charged for operating in an autonomous mode.

That is, the battery is designed to operate the robot body over eight hours at a exploration mode, and outputs a DC voltage.

The battery accompanies a battery management system (BMS) which is capable of security monitoring of temperature, voltage and leakage, and lithium ion cells are employed.

The system design also takes into account of a voltage drop due to the primary cable 220 itself when carrying the power transmission.

The DC/DC converter, which is a small, high-capacity, commercial converter generating a low heat, is commonly used in the robot body and the depressor 200, and it supplies proper amounts of power to the respective equipments of the robot body through the secondary cable 240.

Power Distribution and Communication of Depressor 200

Power distribution is carried out in the order of the primary cable 220 > step-down transformer > rectifier ⇒ DC/DC converter and secondary cable 240 (robot body) ⇒ respective equipmente.

A transformer is provided as designed for transmitting the power transmission via the primary cable 220, and 3-phase bridge rectifier is used for AD-DC current rectification.

On the other hand, Ethernet-based communications are established between the underwater robot 100, the depressor 200 and an interior remote control room in the mothership 300, while an optical communication converter is designed based on an optical communication-Ethernet conversion.

In order to take advantage of the remote control room of the multi-joint underwater robot 100 for deep sea, a conventional optical communication conversion device, such as a light converter is introduced.

Fixtures are designed for the robot body employing a linear actuator and link system, primary and secondary cable termination couplings, and respective fixtures for the pressure housings, junction boxes, transformer boxes, USBL, pan and tilt arrangement, altimeter and ballasting weight.

The robot body frame is fabricated using an aluminum alloy for corrosion resistance, and is deposited with a sacrificial anode to prevent corrosion by seawater, and it can be mounted with the robot body fixtures and the ballasting weight.

Figure 19:
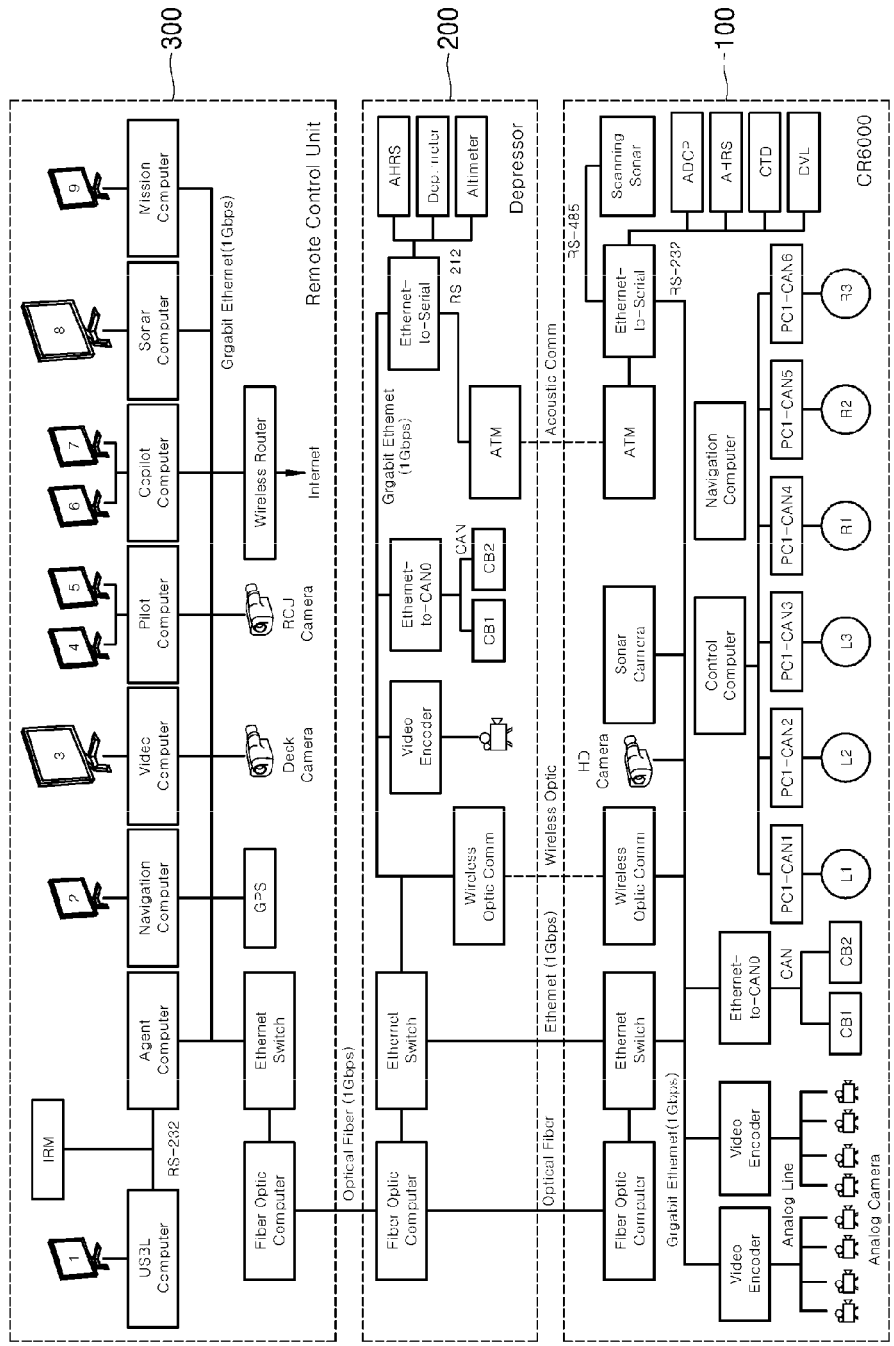
FIG. 19 is a block diagram for explaining a remote control operation on the deep-sea exploration multi-joint underwater robot system according to some embodiments of the present invention.

FIG. 19 is a block diagram for explaining a remote control operation on the deep-sea exploration multi-joint underwater robot system according to some embodiments of the present invention, including the multi-joint underwater robot 100, depressor 200 and mothership 300.

The deep-sea exploration multi-joint underwater robot system according to some embodiments is capable of remotely monitoring information obtained from the tracker, the mounted cameras and sensor devices on the multi-joint underwater robot 100 and the depressor 200, and controlling the operation of the underwater robot remotely.

To this end, the mothership 300 is installed with a walking and swimming algorithm for remotely controlling the multi-joint underwater robot 100 as well as a program for tracking the positions of the multi-joint underwater robot 100 and the depressor 200.

There are also provided an apparatus for real-time monitoring of images from the optical cameras and a scan sonar as well as information of data from various sensors mounted on the multi-joint underwater robot 100 and the depressor 200.

In this way, the spherical glass pressure housing with the titanium band and the deep-sea exploration multi-joint underwater robot system using thereof according to some embodiments of the present invention can probe the seafloor with the minimum area to support, and can stand fixed and may change their posture using the deep-sea legs, to achieve stable and extra close underwater operations continuously even at slopes and rugged terrains.

In addition, the multi-joint underwater robot and the depressor are provided with predetermined pressure housings for allowing the respective units to withstand a deep-sea water pressure, and shield their built-in equipment from possible intrusion of seawater to transmit marine research data and underwater status data to the mothership that controls the moving direction of the underwater robot.

According to some embodiments as described above, the deep-sea exploration multi-joint underwater robot system can probe the sea floor with the minimum area to support to minimize the disturbance of the deposited soil of deep seafloor, and is capable of standing still with deep-sea legs and changing posture of the system, to achieve stable and high-precision underwater operations.

In addition, the deep-sea exploration multi-joint underwater robot system is capable of performing stable and high-precision operations even at slopes, rugged terrain, etc. In addition, the capability of the system to travel by walking about the seafloor allows an extra close and continuous exploration of the seafloor.

In addition, the pressure housing is of a spherical design for minimizing the buoyancy material and with a design in the form of connecting two legs, left and right, a simplified wiring operation and an improved maintainability is made possible, and the structural safety of the pressure housing and shortening the production time of the system may be promoted.

Moreover, reliable watertightness is ensured through various O-rings, a direct coupling method is used for underwater connectors to bring minimized footprint, reductions in the diameter and in the radius of curvature of the secondary cable and to secure an internal symmetry thereof.

Some preferred embodiments of the present invention as above are presented merely as possible exemplary embodiments, but in any sense, they are not to be construed as limiting the present invention. It should be well understood by a person having ordinary skill in the art to which this invention belongs that the present invention covers various modifications, changes or substitutions in implementations or can be equivalently implemented based on the foregoing description.

What is claimed is:

1. A deep-sea exploration multi-joint underwater robot system, comprising:
a multi-joint underwater robot configured to have a plurality of first pressure housings and a plurality of second pressure housings for withstanding a deep-sea water pressure and shielding built-in equipment from an intrusion of seawater, to perform a proximity and precision exploration of a seabed terrain while obtaining marine research data to transmit underwater status data, and to have a hydrodynamic streamlined body for an underwater mobility;
a mothership configured to receive and store the marine research data and the underwater status data, monitor moving directions of the multi-joint underwater robot, and control the moving directions; and
a depressor configured to have a third pressure housing, be linked with the mothership by a primary cable and with the multi-joint underwater robot by a secondary cable, and prevent a water resistance of the primary cable from being transmitted to the multi-joint underwater robot, wherein
the plurality of first pressure housings have a spherical formation and are mounted on a robot body frame of the multi-joint underwater robot, the plurality of second pressure housings have a cylindrical formation and are mounted between a plurality of left and right legs, respectively, and the third pressure housing has a cylindrical formation and is mounted in a platform of the depressor.

2. The deep-sea exploration multi-joint underwater robot system of claim 1, wherein the multi-joint underwater robot comprises:
a robot body frame configured to mount the plurality of first pressure housings through joint units;
three pairs of legs, each configured to have an oil-filled type articulation link for a water-resistant operation with a 4-degree of freedom and to have a streamlined shape for underwater swimming and walking;
a body and leg connection configured to couple the plurality of first pressure housings to the robot body frame through flanges; and
a robot body junction box configured to distribute a power supply line, an optical fiber cable and an Ethernet cable of the secondary cable, wherein
grippers are mounted on one or more legs for interchangeable use as one or more robot arms and are arranged to be operable by a linear driver distally of the one or more legs.

3. The deep-sea exploration multi-joint underwater robot system of claim 2, wherein the robot body junction box is configured to have an open surface formed of a transparent reinforced plastic material for checking a status of flow rate and for wiring, and a first built-in leak sensor.

4. The deep-sea exploration multi-joint underwater robot system of claim 1, wherein the depressor further comprises:
a depression junction box configured to receive an electric power and optical communications through the primary cable and separate the electric power from the optical communications to transfer the electric power to a transformer, and distribute the optical communications to the third pressure housing; and
a transformer box configured to package and protect the transformer.

5. The deep-sea exploration multi-joint underwater robot system of claim 3, wherein the depression junction box is configured to be installed internally with a rectifier for receiving an electric power which is stepped down by the transformer and converting a stepped-down electric power to a direct current (DC) power; and a second leak sensor.

6. The deep-sea exploration multi-joint underwater robot system of claim 5, wherein the transformer box is configured to be installed internally with the transformer for converting a high-voltage alternating current (AC) transmitted via the primary cable into a low-voltage AC current; and a third leak sensor.

7. The deep-sea exploration multi-joint underwater robot system of claim 5, wherein the multi-joint underwater robot further comprises:
a battery configured to be charged with a converted DC power as received from the rectifier; and a DC/DC converter configured to step down the converted DC power as received, and to supply a stepped-down DC power to respective equipment on board the robot body frame, wherein the battery is adapted to be incorporated in a pressure-resistant sphere which comprises a pair of glass hemispheres and a band of a predetermined height interposed between the glass hemispheres.

8. A spherical glass pressure housing, for use in an underwater exploration system, including a titanium band, a multi-joint underwater robot, a depressor and a mothership, the spherical glass pressure housing comprising:

a plurality of first pressure housings and a plurality of second pressure housings configured to enable the multi-joint underwater robot to withstand a deep-sea water pressure and shield built-in equipment from an intrusion of seawater;

a third pressure housing configured to enable the depressor to withstand a deep-sea water pressure and shield built-in equipment from an intrusion of seawater; and a pressure-resistant sphere configured to include a band of a predetermined height, interposed between a pair glass hemispheres, that applies to a battery installed on the multi-joint underwater robot, wherein the plurality of first pressure housings have a spherical formation and are mounted on a robot body frame of the multi-joint underwater robot, the plurality of second pressure housings have a cylindrical formation and are mounted between a plurality of left and right legs, respectively, and the third pressure housing has a cylindrical formation and is mounted inside a platform of the depressor.

9. The spherical glass pressure housing including a titanium band of claim 8, wherein the first pressure housings each comprises:

a pair of pressure-resistant glass hemispheres;

a connector junction cylinder configured to be positioned between the pair of pressure-resistant glass hemispheres and to be coupled with a plurality of underwater connectors; and an assembly configured to prevent damage of the pressure-resistant glass hemispheres.

10. The spherical glass pressure housing including a titanium band of claim 9, wherein the connector junction cylinder is made of titanium material.

11. The spherical glass pressure housing including a titanium band of claim 8, wherein the second pressure housings each comprises:

an underwater connector disposed in a cylinder center;

a motor driver fixture jig configured to mount a motor driver;

a double O-ring configured to ensure a watertight seal at a contact portion of a cylinder cap with an inner cylinder wall; and flanges configured to fix the second pressure housings respectively between two legs of the plurality of left and right robot legs.

12. The spherical glass pressure housing including a titanium band of claim 8, wherein the third pressure housing comprises:

cylinder caps configured to be attached to the cylinder on both sides;

a V-band configured to couple and fasten each of the cylinder caps to the third pressure housing; and an electrical and electronic parts fixture jig configured to mount electrical and electronic parts.

13. The spherical glass pressure housing including a titanium band of claim 8, wherein the first pressure housings are configured to internally mount underwater electronic equipment, camera electronics, high definition (HD) pan-tilt cameras, motors and junction box electronics, and lighting electronic equipment, respectively, and to provide a watertight sealing.

14. The spherical glass pressure housing including a titanium band of claim 13, wherein the first pressure housings are configured to internally mount the camera electronics and the high definition (HD) pan-tilt cameras, where the pair of glass hemispheres has a permeability and is treated with an anti-distortion polishing.

* * * * *